United States Patent
Creed et al.

(10) Patent No.: US 11,762,770 B2
(45) Date of Patent: Sep. 19, 2023

(54) CACHE MEMORY MANAGEMENT

(71) Applicant: EMC IP Holding Company LLC, Hopkinton, MA (US)

(72) Inventors: John Creed, Innishannon (IE); John Krasner, Coventry, RI (US)

(73) Assignee: EMC IP Holding Company LLC, Hopkinton, MA (US)

( * ) Notice: Subject to any disclaimer, the term of this patent is extended or adjusted under 35 U.S.C. 154(b) by 5 days.

(21) Appl. No.: 17/076,940

(22) Filed: Oct. 22, 2020

(65) Prior Publication Data

US 2022/0129379 A1 Apr. 28, 2022

(51) Int. Cl.
*G06F 12/0802* (2016.01)

(52) U.S. Cl.
CPC .... *G06F 12/0802* (2013.01); *G06F 2212/282* (2013.01)

(58) Field of Classification Search
None
See application file for complete search history.

(56) References Cited

U.S. PATENT DOCUMENTS

| | | | |
|---|---|---|---|
| 9,372,825 B1 * | 6/2016 | Shee | H04L 67/1097 |
| 2016/0147656 A1 * | 5/2016 | Hower | G06F 12/0833 711/130 |
| 2019/0042386 A1 * | 2/2019 | Barczak | G06F 11/3452 |
| 2020/0012602 A1 * | 1/2020 | Zhao | G06F 12/0848 |
| 2021/0124508 A1 * | 4/2021 | George | G06F 3/0604 |
| 2021/0349831 A1 * | 11/2021 | Cooray | G06F 9/3009 |

* cited by examiner

*Primary Examiner* — Charles J Choi
(74) *Attorney, Agent, or Firm* — Krishnendu Gupta; Nikhil Patel

(57) ABSTRACT

One or more aspects of the present disclosure relate to cache memory management. In embodiments, a global memory of a storage array into one or more cache partitions based on an anticipated activity of one or more input/output (IO) service level (SL) workload volumes can be dynamically partitioned.

20 Claims, 4 Drawing Sheets

300

Dynamically partitioning global memory

CACHE MEMORY MANAGEMENT

BACKGROUND

Memory management is a form of resource management applied to computer memory. Memory management can be used to provide ways to dynamically allocate portions of memory to programs at their request, and free it for reuse when no longer needed. Enabling more efficient memory management can be important to computer systems where more than a single process might be underway at any time.

SUMMARY

One or more aspects of the present disclosure relate to cache memory management. In embodiments, a global memory of a storage array into one or more cache partitions based on an anticipated activity of one or more input/output (IO) service level (SL) workload volumes can be dynamically partitioned.

In embodiments, an IO workload can be received. Further, one or more SL workload volumes received within the IO workload can be determined.

In embodiments, the IO workload can include one or more IO operations. Each IO operation can also include at least one of: a read request and a write request In embodiments, a current state of the global memory can be determined. Further, historical IO patterns of the IO workloads previously received by the storage array can be identified.

In embodiments, a current state of the global memory can be determined. Further, an SL workload usage patterns of the global memory can be identified based on a history IO SL workload usage of the global memory.

In embodiments, a current state of each cache slot of the global memory can be determined. An IO operation SL tier usage pattern of each cache slot can also be identified based on a history of IO SL tier usage of each cache slot. Each SL tier can correspond to an expected performance metric related to processing an IO operation of each SL tier by the storage array.

In embodiments, an SL trend model corresponding to the SL tier usage pattern can be generated using a machine learning (ML) engine configured to process IO workloads. The ML engine can include pattern learning logic such as inference learning logic.

In embodiments, the global memory can be dynamically partitioned into one or more cache banks based on the SL trend model.

In embodiments, the SL trend model can include instructions to control usage of each cache slot and/or cache bank by incoming IO operations.

In embodiments, each cache slot to cache IO operations of a particular SL tier can be dynamically assigned by modifying metadata of each cache. Additionally, a time threshold during which each cache slot can be exclusively assigned to cache IO operations associated with any particular SL tier can be established.

BRIEF DESCRIPTION OF THE DRAWINGS

The foregoing and other objects, features and advantages will be apparent from the following more particular description of the embodiments, as illustrated in the accompanying drawings in which like reference characters refer to the same parts throughout the different views. The drawings are not necessarily to scale, emphasis instead being placed upon illustrating the principles of the embodiments.

FIG. 3 is a flow diagram of a method for cache memory management in accordance with example embodiments disclosed herein.

DETAILED DESCRIPTION

Figure 1:
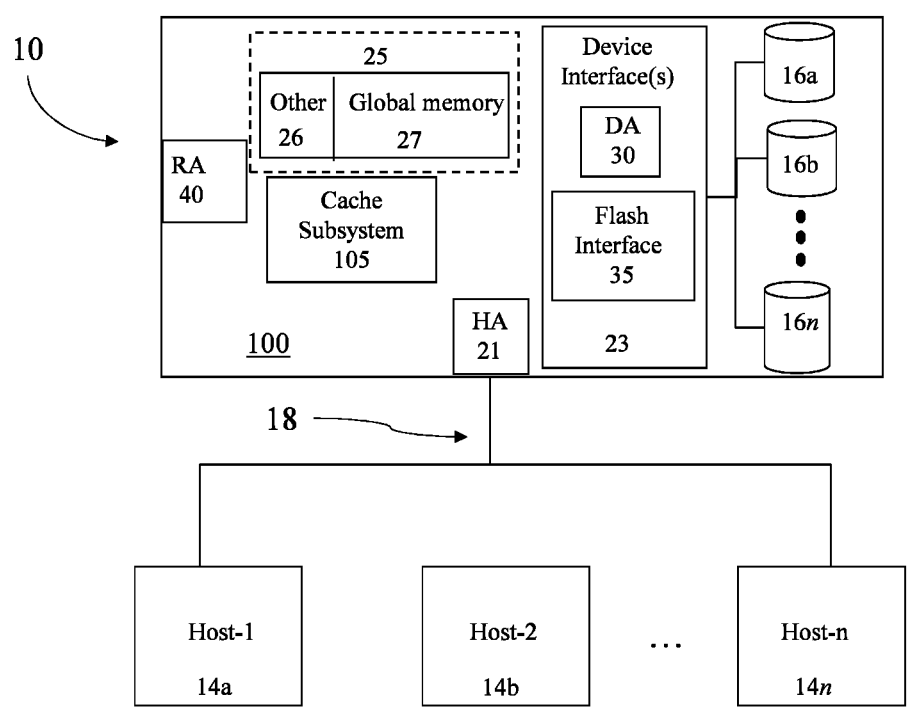
FIG. 1 is a block diagram of an example a storage system in accordance with example embodiments disclosed herein.

A storage array can include global memory configured to, e.g., enable efficient processing of at least one input/output operation (IO). The IO can be received from a host that expects a certain service level (SL) performance of the storage array (e.g., a response time). Accordingly, the global memory can include volatile (e.g., non-persistent) memory having including cache slots having fast data read/write response times. Further, the global memory can include a cache subsystem that is can include logic and/or circuitry configured to perform one or more memory management techniques that efficiently process IOs.

In embodiments, the cache subsystem can be configured to dynamically allocate memory and synchronize services for sections of memory. The sections of memory can be organized into banks of cache slots. The dynamic memory allocation techniques can include allocating and/or deallocating cache slots of the cache subsystem. For example, the cache subsystem can include intelligent and adaptive algorithms that recycle cache slots and manage global memory resources. In response to receiving an input/output (IO) operation, the cache subsystem can place data involved in the operation into a cache slot. During heavy workloads, each cache slot allocated to store data involved in IO operations (IOs) can be full. Accordingly, incoming operations involving data tracks that are not cached must wait for one or more cache slots to become available. In embodiments, the cache subsystem can unbind and deallocate a cache slot previously associated with a previous data track for data involved in an IO operation recently received by the storage array.

In embodiments, the cache subsystem can queue IOs involving data that are not currently cached in a cache queue if each cache slot is full. Generally, current naïve cache subsystems use a least recently used (LRU) technique to unbind and deallocate cache slots for data involved with each of the queued IOs. However, the current LRU techniques treat the IOs equally and cannot distinguish high priority IOs from low priority IOs. Consequently, the current LRU techniques can cause low priority IOs to consume available memory resources, leaving higher priority IOs waiting for memory resources. Moreover, the lower priority IOs generally involve data stored in lower SL storage tiers that have slow performance. For example, the lower SL storage tiers can include, e.g., a hard disk drive (HDD) that require an amount of time to perform read/write operations that causes a queue of IOs to become quite large. As such, the storage array can experience a reduction in performance (e.g., high priority IOs can be delayed, overall workload throughput can decrease, and response times can increase). Consequently, the storage array can become incompliant with one or more Service Level Objectives (SLOs) as defined by a Service Level Agreement (SLA) between a host and a storage array vendor (e.g., Dell Technologies, Inc.).

Embodiments of the present disclosure relate to cache memory management techniques that can tune global memory resources to maximize performance and ensure compliance with a customer's service level agreement (SLA). In embodiments, a global memory of a storage array into one or more cache partitions based on an anticipated activity of one or more input/output (IO) service level (SL) workload volumes can be dynamically partitioned.

Referring to FIG. 1, shown is an example system 10 that may be used in connection with performing embodiments of the present disclosure described herein. The system 10 includes a data storage array 100 connected to host systems 14a-n through communication medium 18. In embodiments, the hosts 14a-n can access the data storage array 100, for example, to perform input/output (IO) operations or data requests. The communication medium 18 can be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network (including a Storage Area Network (SAN)) or other wireless or other hardwired connection(s) by which the host 14a-n can access and communicate with the data storage array 100. The hosts 14a-n can also communicate with other components included in the system 10 via the communication medium 18.

Each of the hosts 14a-n and the data storage array 100 can be connected to the communication medium 18 by any one of a variety of connections as may be provided and supported in accordance with the type of communication medium 18. The processors included in the hosts 14a-n may be any one of a variety of proprietary or commercially available single or multi-processor system, such as an Intel-based processor, or other type of commercially available processor able to support traffic in accordance with each embodiment and application.

It should be noted that the examples of the hardware and software that may be included in the data storage array 100 are described herein in more detail and can vary with each embodiment. Each of the hosts 14a-n and data storage array 100 can all be located at the same physical site or can be located in different physical locations. Examples of the communication medium 18 that can be used to provide the different types of connections between the host computer systems and the data storage system of the system 10 can use a variety of different communication protocols such as SCSI, Fibre Channel, iSCSI, and the like. Some or all the connections by which the hosts 14a-n and data storage array 100 can be connected to the communication medium may pass through other communication devices, such switching equipment that may exist such as a phone line, a repeater, a multiplexer or even a satellite.

Each of the hosts 14a-n can perform different types of data operations in accordance with different types of tasks. In embodiments, any one of the hosts 14a-n may issue a data request to the data storage array 100 to perform a data operation. For example, an application executing on one of the hosts 14a-n can perform a read or write operation resulting in one or more data requests to the data storage array 100.

It should be noted that although element 12 is illustrated as a single data storage system, such as a single data storage array, element 12 may also represent, for example, multiple data storage arrays alone, or in combination with, other data storage arrays, systems, appliances, and/or components having suitable connectivity, such as in a SAN, in an embodiment using the embodiments herein. It should also be noted that an embodiment may include data storage arrays or other components from one or more vendors. In subsequent examples illustrated the embodiments herein, reference may be made to a single data storage array by a vendor, such as by DELL Technologies of Hopkinton, Mass. However, as will be appreciated by those skilled in the art, the embodiments herein are applicable for use with other data storage arrays by other vendors and with other components than as described herein for purposes of example.

The data storage array 100 may be a data storage array including a plurality of data storage devices 16a-n. The data storage devices 16a-n may include one or more types of data storage arrays such as, for example, one or more disk drives and/or one or more solid state drives (SSDs). An SSD is a data storage device that uses solid-state memory to store persistent data. An SSD using SRAM or DRAM, rather than flash memory, may also be referred to as a RAM drive. SSD may refer to solid state electronics devices as distinguished from electromechanical devices, such as hard drives, having moving parts. Flash devices or flash memory based SSDs are one type of SSD that contains no moving parts. The embodiments described herein can be used in an embodiment in which one or more of the devices 16a-n are flash drives or devices. More generally, the embodiments herein may also be used with any type of SSD although following paragraphs can refer to a particular type such as a flash device or flash memory device.

The data storage array 100 may also include different types of adapters or directors, such as an HA 21 (host adapter), RA 40 (remote adapter), and/or device interface 23. Each of the adapters HA 21, RA 40 may be implemented using hardware including a processor with local memory with code stored thereon for execution in connection with performing different operations. The HA 21 may be used to manage communications and data operations between one or more host systems 14a-n and the global memory (GM) 25b. In an embodiment, the HA 21 may be a Fibre Channel Adapter (FA) or another adapter which facilitates host communication. The HA 21 may be characterized as a front-end component of the data storage array 100 which receives a request from one or more of the hosts 14a-n. The data storage array 100 can include one or more RAs (e.g., RA 40) that may be used, for example, to facilitate communications between data storage arrays. The data storage array 100 may also include one or more device interfaces 23 for facilitating data transfers to/from the data storage devices 16a-n. The data storage interfaces 23 may include device interface modules, for example, one or more disk adapters (DAs) 30 (e.g., disk controllers), flash drive interface 35, and the like. The DA 30 can be characterized as a back-end component of the data storage array 100 which interfaces with the physical data storage devices 16a-n.

One or more internal logical communication paths may exist between the device interfaces 23, the RAs 40, the HAs 21, and the memory 26. An embodiment, for example, may use one or more internal busses and/or communication modules. For example, the global memory 27 may be used to facilitate data transfers and other communications between the device interfaces, HAs and/or RAs in a data storage array. In one embodiment, the device interfaces 23 may perform data operations using a cache that may be included in the global memory 27, for example, when communicating with other device interfaces and other components of the data storage array. The other portion 25a is that portion of memory that may be used in connection with other designations that may vary in accordance with each embodiment.

The data storage system as described in this embodiment, or a device thereof, such as a disk or aspects of a flash device, should not be construed as a limitation. Other types of commercially available data storage systems, as well as processors and hardware controlling access to these devices, may also be included in an embodiment.

Host systems 14a-n provide data and access control information through channels to the storage systems 12, and the storage systems 12 may also provide data to the host systems 14a-n also through the channels. The host systems 14a-n do not address the drives or devices 16a-n of the storage systems directly, but rather access to data can be provided to one or more host systems 14a-n from what the host systems view as a plurality of logical devices or logical volumes (LVs). The LVs may or may not correspond to the actual physical devices or drives 16a-n. For example, one or more LVs may reside on a single physical drive or multiple drives. Data in a single data storage system, such as a single data storage array 100, may be accessed by multiple hosts allowing the hosts to share the data residing therein. The HA 21 may be used in connection with communications between a data storage array 100 and one or more of the host systems 14a-n. The RA 40 may be used in facilitating communications between two data storage arrays. The DA 30 may be one type of device interface used in connection with facilitating data transfers to/from the associated disk drive(s) 16a-n and LV(s) residing thereon. A flash device interface 35 may be another type of device interface used in connection with facilitating data transfers to/from the associated flash devices and LV(s) residing thereon. It should be noted that an embodiment may use the same or a different device interface for one or more different types of devices than as described herein.

The device interface, such as a DA 30, performs IO operations on a drive 16a-n. In the following description, data residing on an LV may be accessed by the device interface following a data request in connection with IO operations that other directors originate. Data may be accessed by LV in which a single device interface manages data requests in connection with the different one or more LVs that may reside on a drive 16a-n. For example, a device interface may be a DA 30 that accomplishes the foregoing by creating job records for the different LVs associated with a device. These different job records may be associated with the different LVs in a data structure stored and managed by each device interface.

A cache subsystem 105 can manage use of the global memory 27 by, e.g., dynamically partitioning the global memory's caches (e.g., cache 205 of FIG. 2) as described in greater detail in the following paragraphs. In embodiments, the cache subsystem 105 can exist external to the data storage array 100. Accordingly, the cache subsystem 105 may communicate with the data storage array 100 using any one of a variety of communication connections. In one embodiment, the cache subsystem 105 can communicate with the data storage array 100 through, e.g., a serial port, a parallel port and a network interface card to establish, e.g., an Ethernet connection. Using the Ethernet connection, for example, a memory management processor may communicate directly with DA 30 and HA 21 within the data storage array 100.

Figure 2:
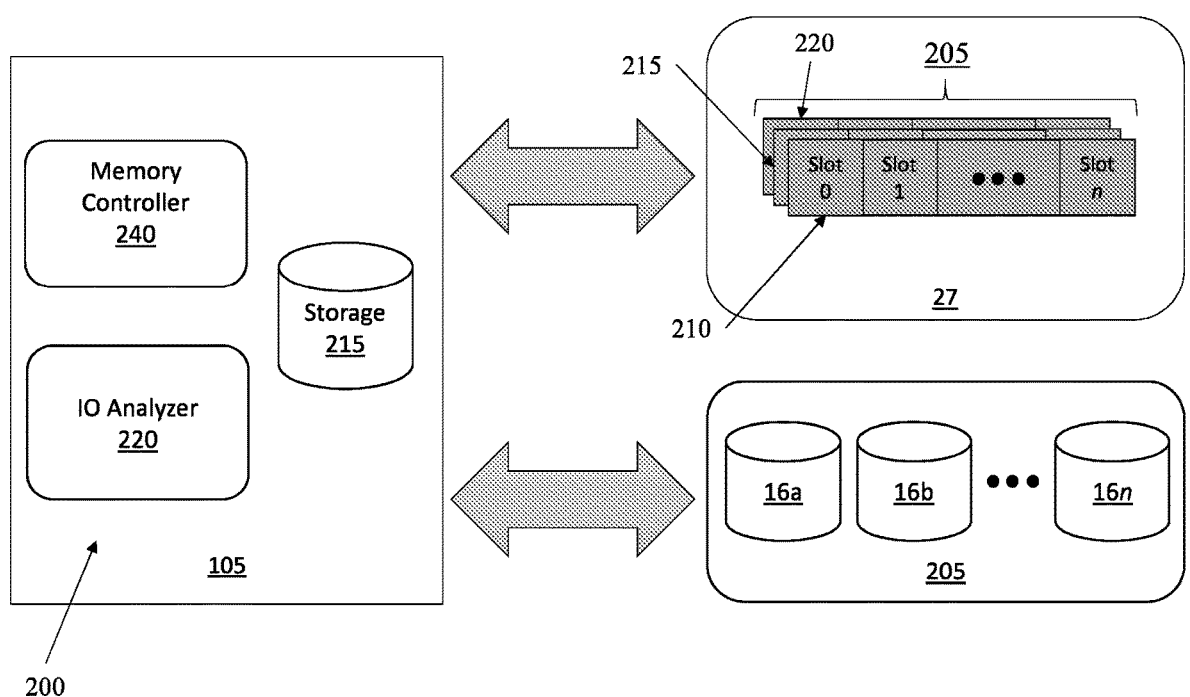
FIG. 2 is a block diagram of a memory management processor (MMP) in accordance with example embodiments disclosed herein.

Referring to FIG. 2, a cache subsystem 105 can be configured to manage global memory 27 of FIG. 1. For example, the array 100 can receive one or more heavy IO workloads from one or more of the hosts 14a-n. During such a period of heavy IO workloads, the array 100 may not be able to achieve a quality of service (QOS) (e.g., response time) for each service level defined by a service level agreement (SLA). As such, the array 100 can include logic and/or circuitry configured to limit non-critical IO consumption of cache slots 0-n of the global memory's cache 205, while maintaining and/or increasing an amount of the cache slots 0-n assigned to process critical IOs. For example, the subsystem 105 can include hardware and/or software elements 200 that dynamically adjusts cache allocations in response to identifying changes in IO service level workload profiles as described in greater detail herein.

In embodiments, a host (e.g., a user of the host devices 14a-n) can use require the storage array 100 to manage, distribute, and access important corporate data. The host can generate the information using one or more applications installed on, e.g., the host device 14a. Additionally, the host can assign varying levels of importance to the functions performed by each application. Thus, the host can deem data generated and/or used by an important application to be critical ("critical IOs"). Further, the host device 14b can include applications performing functions the host deems to be of average significance. Accordingly, the host can deem the data generated and/or used by such applications to be non-critical ("non-critical IOs"). Thus, hosts can establish a Service Level Agreement (SLA) with a storage array vendor to define service levels (SLs), e.g., a quality of service (QoS) for each application. Additionally, the SLA group SLs into SL tiers based on one or more ranges of QoS. Thus, based on the data and/or application involved with the IO, the host devices 14a-n can include SL tier information in, e.g., each IO's metadata.

In embodiments, the subsystem 105 can include an IO analyzer 220 configured to analyze one or more IOs to identify the SL tier. The IO analyzer 220 can extract information included in the metadata from each IO and identify one or more IO characteristics. The IO characteristics can correspond to one or more of: an IO type (e.g., read or write operation), data involved with each IO, and SL of each IO, amongst other relevant information (e.g., telemetry metrics) that can influence cache memory management decisions and/or policies.

In some embodiments, each IO's metadata can also identify one or more of the IO's target storage resource for performing, e.g., a read and/or write of the involved data. The storage resource can be a volume of one of the storage devices 16a-n. The storage resources can include storage drives 16a-n, amongst other known storage and memory devices. Further, each storage device 16a-n can be grouped into a storage tier based on their respective storage and/or performance capabilities (e.g., response time).

For example, the drives 16a-n can include, e.g., one or more hard disk drives (HDDs) and solid-state drives (SSDs), amongst other known drive types. Generally, HDDs include moving parts and as such, have a slow performance profile. On the other hand, SSDs have a fast performance profile because they generally include memory cells (e.g., flash memory cells) that are configured to be instantly accessible. Accordingly, those drives 16a-n having a fast performance profile similar to that of an SSD can be grouped in higher storage tiers. Thus, those drives 16a-n having a performance profile similar to HDDs are grouped in lower tier storage tiers. In other examples, each storage tier can be defined by a performance window having a floor response time and a ceiling response time. As such, each of the drives 16a-n can are grouped to a storage tier based on the performance window.

To ensure the array 100 can meet the SLA, the analyzer 220 can collect information corresponding to historical and/or current IO workloads. Based on an analysis of the collected information, the analyzer 220 can identify one or more of each workload's IO pattern, IO workload patterns, storage resource activity level patterns. Using the identified patterns, the analyzer 220 can anticipate IO workloads. Additionally, the analyzer 220 can collect information corresponding to historical and/or current activity levels of each storage device's corresponding storage volumes. Based on an analysis of the collected information, the analyzer 220 can determine usage metrics of the global memory's cache 205 for each SL tier. In addition, the analyzer 220 can include one or more machine learning engines including, e.g., logic and/or circuitry to perform an inference learning process. Using inference learning, the analyzer 220 can generate one or more cache partition models.

In embodiments, a memory controller 240 can use a cache partition model to partition the cache 205 into SL cache groups 210, 215, 220. For instance, the memory controller 240 can use the model to dynamically set a bit in each slot's metadata the defines an SL assignment. Thus, those slots 0-n having an equivalent bit value form one of the SL cache groups 210, 215, 220. Specifically, the controller 240 identify IO workloads based on SL tiers. As such, the memory controller 240 can assign an amount of the cache slots 0-9 into the groups 210, 215, 220 based on an expected volume of IOs associated with each SL tier.

In response to partitioning the cache 205, the analyzer 220 can collect performance metrics of a resulting configuration of cache slot groups 210, 215, 220. The analyzer 220 can further optimize a corresponding cache partition model based on the collected performance metric. For instance, the performance metrics can provide a feedback to the analyzer's machine learning engine. The feedback can include information corresponding to the amounts of cache slots assigned to each SL, response times for processing corresponding IOs, and a compliance or incompliance with each SL. Accordingly, the machine learning engine can use the feedback to tune cache slot groupings. In situations where each group 210, 215, 220 complied with their assigned SL, the engine can use the feedback to determine a possibility of greater tuning each SL's cache slot allocation to achieve a greater reduction in response times. Similarly, if one or more of the groups could not achieve compliance, the engine can use the feedback to rectify any incorrect inference.

In embodiments, the cache subsystem 105 can be any one of a variety of commercially available processors, such as an Intel-based processor, and the like. For example, the cache subsystem 105 can be a parallel processor such as a graphical processing unit (GPU). Although the hardware and/or software elements 200 are illustrated as residing in the cache subsystem 105, all or portions of the illustrated elements 200 can also reside elsewhere such as on, for example, HA 21 of FIG. 1.

Referring to FIG. 3, the cache subsystem 105 can include circuitry and/or logic 300 configured to manage global memory 27. In embodiments, the cache subsystem 105 can include memory manager 334 that can gather and store memory status data of, e.g., global memory 27 and workload data received by HA 21 in data store 336. The memory status data can include memory class information, capacity information, metadata regarding data units stored in each unit of memory, cache pool types and sizes, and cache slot segment sizes amongst other known types of memory status data. The manager 334 can also monitor input/output (IO) streams that include operations such as read/write operations received by HA 21. By analyzing the IO streams, the manager 334 can anticipate IO workloads that the storage array 100 can expect to receive in one or more time-windows (e.g., current and/or future).

Based on one or more of the anticipated workloads, a customer's SLA, and memory status data, a memory optimizer 338 can dynamically partition one or more of the caches 215-220 of the storage device's global memory 27. For example, the optimizer 338 can re-allocate amounts of cache assigned to the each of the global memory's mirrored segments 225,235 and unmirrored cache segments 230 based on the anticipated workloads.

In embodiments, the cache subsystem 105 can partition the cache segments 225, 230, 235 along one or more dimensions. For example, the cache subsystem 105 can partition the cases along a first dimension corresponding to IO type (e.g., read or write operation) and a second dimension corresponding to a track size of each IO operation included in an IO stream (e.g., workload). By partitioning the cache segments cache segments 225, 230, 235 along one or more dimensions, the cache subsystem 105 can advantageously provide higher memory resolution and optimization, while also avoiding wasted cache segments that mirror read operations.

In embodiments, the manager 334 can sample cache memory storage groups of each of the cache segments 225, 230, 235 over a predetermined and or dynamically established interval. The manager 3344 can also group IO workloads into clusters of IO operations based on IO type and track size of each IO operation (e.g., the first and second dimensions). Further, the manager 334 can establish cache slots (e.g., bins) based on each cluster's properties corresponding to the first and second dimensions.

Using one or more machine learning (ML) techniques, the memory manager 334 can further analyze historical and current IO workloads to anticipate IO workloads that the storage array 100 can expect to receive in one or more future time-windows. In embodiments, the manager 334 can use the ML techniques to analyze workloads corresponding to each of the bins. Thus, the memory manager 334 can define the anticipated workloads based on IO types, IO sizes, track sizes, and SLs associated with each IO, activity types, amongst other parameters and patterns of each parameter (e.g., frequency). Activity types can be one or more of Online Transaction Processing (OLTP), Teradata, random, and sequential IO streams.

In embodiments, the manager 334 can use a recurring neural network (RN N) to analyze the historical and current IO workloads. The RNN can be a Long Short-Term Memory (LSTM) network that anticipates the workloads based on historical/current IO workload input parameters. Further, the ML techniques can include a time series learning logic to anticipate the workloads. The manager 334 can use parameters such as include IO types and sizes, logical block address (LBA), response times, IO data types, IO payloads, and time of any observed IO pattern, amongst other input parameters for ML analysis.

In embodiments, the manager 334 can establish one or more cache memory partition models using results of the ML analysis.

For example, a first model can correspond to a first anticipated workload expected the manager 334 expects the storage array 100 to receive during a first time-window. The first time-window can, e.g., correspond to a period during operational business hours of a customer. During the first time-window, model may define the first anticipated workload to include a larger percentage of write vs read IO operations. As stated herein, write data is generally stored in mirrored cache slots to ensure copies exist in case of an error caused by, e.g., power loss, failover, and a data breach, amongst other factors. Accordingly, the memory management processor may allocate a greater number of cache slots (bins) to the global memory's mirrored segment 305 vs the global memory's unmirrored segment 225.

Further, the memory management processor may predict that the first anticipated write workload is likely to include, from greatest to lowest in frequency, write IO sizes of 8K, 64K, and 128K. Similarly, the processor may predict that the first anticipated read workload is likely to include, from greatest to lowest in frequency, read IO sizes of 64K, 128K, and 8K. Based on the predicted read/write workloads, the processor allocates cache slot bins to each of the cache segments 225, 230, 235 being sized according to the IO sizes (e.g. track sizes).

Further, a second model re-partition the mirrored and unmirrored memory segments 225, 230, 235 based on, e.g., a second anticipated workload expected to be received during a second time-window. The second time-window can correspond to, e.g., end of day business operations of the customer. During the second time-window, the second model define the second anticipated workload as including a larger percentage of read vs write IO operations. As stated herein, read data is generally stored in unmirrored cache slots because the data is typically read from disk, which inherently includes original copies of the read data. Accordingly, the memory management processor may allocate a greater portion to global memory's unmirrored segment 230 rather than the global memory's mirrored segments 225, 235.

Further, first model may predict that the first anticipated write workload is likely to include, from greatest to lowest in frequency, write IO sizes of 128K, 8K, and 64K. Similarly, the second model may predict that the second anticipated read workload is likely to include, from greatest to lowest in frequency, read IO sizes of 64K, 16K, and 8K. Based on the predicted read/write workloads defined by each of the models, the optimizer 338 can repartition and/or reallocate cache slot bins to each of one or more of the cache segments 225, 230, 235.

In embodiments, the optimizer 338 can use memory partition models to partition and/or repartition the bins of each cache memory segment 225, 230, 235. For example, the manager 334 can establish a searchable data structure that associates each anticipated workload characteristic to one or more of the cache models. The optimizer 338 can monitor the IO workloads using the anticipated workload characteristics to determine a characteristic of a workload. Based on the workload characteristic, the optimizer 338 can identify one or more of the models that are associated with the determined workload characteristic. Using the identified one or more models, the optimizer 338 can dynamically partition the cache segments 225, 230, 235.

Figure 4:
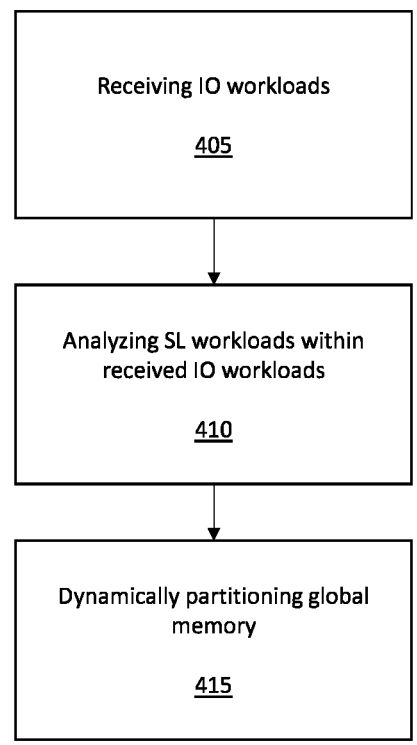
FIG. 4 is a flow diagram of a method for partitioning cache memory in accordance with example embodiments disclosed herein.

FIGS. 3-4 illustrate methods and/or flow diagrams per this disclosure. For simplicity of explanation, the methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter.

Referring to FIG. 3, in embodiments, a method 300 can be executed by a memory management processor (e.g., the cache subsystem 105 of FIG. 1). At 305, the method 300 can include dynamically partitioning a global memory of a storage array into one or more cache partitions based on an anticipated activity of one or more input/output (IO) service level (SL) workload volumes.

It should be noted that the method 300 can be performed according to any of the embodiments described herein, known to those skilled in the art, and/or yet to be known to those skilled in the art.

Referring to FIG. 4, in embodiments, a method 400 can be executed by a memory management processor (e.g., the cache subsystem 105 of FIG. 1). At 405, the method 400 can include receiving an IO workload. At 410, the method 400 can include analyzing one or more SL workload volumes received within the IO workload. Further, the method 400, at 415, can include dynamically partitioning a global memory of a storage array into one or more cache partitions based on an anticipated activity of one or more input/output (IO) service level (SL) workload volumes.

It should be noted that the method 400 can be performed according to any of the embodiments described herein, known to those skilled in the art, and/or yet to be known to those skilled in the art.

The above-described systems and methods can be implemented in digital electronic circuitry, in computer hardware, firmware, and/or software. The implementation can be as a computer program product. The implementation can, for example, be in a machine-readable storage device, for execution by, or to control the operation of, data processing apparatus. The implementation can, for example, be a programmable processor, a computer, and/or multiple computers.

A computer program can be written in any form of programming language, including compiled and/or interpreted languages, and the computer program can be deployed in any form, including as a stand-alone program or as a subroutine, element, and/or other unit suitable for use in a computing environment. A computer program can be deployed to be executed on one computer or on multiple computers at one site.

Method steps can be performed by one or more programmable processors executing a computer program to perform functions of the concepts described herein by operating on input data and generating output. Method steps can also be performed by and an apparatus can be implemented as special purpose logic circuitry. The circuitry can, for example, be a FPGA (field programmable gate array) and/or an ASIC (application-specific integrated circuit). Subroutines and software agents can refer to portions of the computer program, the processor, the special circuitry, software, and/or hardware that implement that functionality.

Processors suitable for the execution of a computer program include, by way of example, both general and special purpose microprocessors, and any one or more processors of any kind of digital computer. Generally, a processor receives instructions and data from a read-only memory or a random-access memory or both. The essential elements of a computer are a processor for executing instructions and one or more memory devices for storing instructions and data. Generally, a computer can include, can be operatively coupled to receive data from and/or transfer data to one or more mass storage arrays for storing data (e.g., magnetic, magneto-optical disks, or optical disks).

Data transmission and instructions can also occur over a communications network. Information carriers suitable for embodying computer program instructions and data include all forms of non-volatile memory, including by way of example semiconductor memory devices. The information carriers can, for example, be EPROM, EEPROM, flash memory devices, magnetic disks, internal hard disks, removable disks, magneto-optical disks, CD-ROM, and/or DVD-ROM disks. The processor and the memory can be supplemented by, and/or incorporated in special purpose logic circuitry.

To provide for interaction with a user, the above described embodiments can be implemented on a computer having a display device. The display device can, for example, be a cathode ray tube (CRT) and/or a liquid crystal display (LCD) monitor. The interaction with a user can, for example, be a display of information to the user and a keyboard and a pointing device (e.g., a mouse or a trackball) by which the user can provide input to the computer (e.g., interact with a user interface element). Other kinds of devices can be used to provide for interaction with a user. Other devices can, for example, be feedback provided to the user in any form of sensory feedback (e.g., visual feedback, auditory feedback, or tactile feedback). Input from the user can, for example, be received in any form, including acoustic, speech, and/or tactile input.

The above described embodiments can be implemented in a distributed computing system that includes a back-end component. The back-end component can, for example, be a data server, a middleware component, and/or an application server. The above described embodiments can be implemented in a distributing computing system that includes a front-end component. The front-end component can, for example, be a client computer having a graphical user interface, a Web browser through which a user can interact with an example implementation, and/or other graphical user interfaces for a transmitting device. The components of the system can be interconnected by any form or medium of digital data communication (e.g., a communication network). Examples of communication networks include a local area network (LAN), a wide area network (WAN), the Internet, wired networks, and/or wireless networks.

The system can include clients and servers. A client and a server are generally remote from each other and typically interact through a communication network. The relationship of client and server arises by computer programs running on the respective computers and having a client-server relationship to each other.

Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network, 802.16 network, general packet radio service (GPRS) network, HiperLAN), and/or other packet-based networks. Circuit-based networks can include, for example, the public switched telephone network (PSTN), a private branch exchange (PBX), a wireless network (e.g., RAN, Bluetooth, code-division multiple access (CDMA) network, time division multiple access (TDMA) network, global system for mobile communications (GSM) network), and/or other circuit-based networks.

The transmitting device can include, for example, a computer, a computer with a browser device, a telephone, an IP phone, a mobile device (e.g., cellular phone, personal digital assistant (PDA) device, laptop computer, electronic mail device), and/or other communication devices. The browser device includes, for example, a computer (e.g., desktop computer, laptop computer) with a world wide web browser (e.g., Microsoft® Internet Explorer® available from Microsoft Corporation, Mozilla® Firefox available from Mozilla Corporation). The mobile computing device includes, for example, a Blackberry®.

Comprise, include, and/or plural forms of each are open ended and include the listed parts and can include additional parts that are not listed. And/or is open ended and includes one or more of the listed parts and combinations of the listed parts.

One skilled in the art will realize the concepts described herein may be embodied in other specific forms without departing from the spirit or essential characteristics thereof. The foregoing embodiments are therefore to be considered in all respects illustrative rather than limiting of the concepts described herein. Scope of the concepts is thus indicated by the appended claims, rather than by the foregoing description, and all changes that come within the meaning and range of equivalency of the claims are therefore intended to be embraced therein.

What is claimed is:

1. An apparatus comprising a memory and at least one processor configured to:
   dynamically partition a global memory of a storage array into one or more cache partitions based on an anticipated activity of one or more input/output (IO) service level (SL) workload volumes, wherein dynamically partitioning the global memory includes partitioning the global memory along a first dimension corresponding to IO type and a second dimension corresponding to track sizes of IO operations in an IO workload;
   dynamically establish SL cache groups from the partitioned global memory based on an anticipated activity, wherein SL cache group establishment includes dynamically setting a bit in each global memory cache slot, defining each cache slot's assigned SL cache group; and
   increase an amount of global memory cache slots assigned to process critical IOs or limit non-critical IO consumption of the global memory cache slots based on a quality of service (QoS) corresponding to each IO service level.

2. The apparatus of claim 1 further configured to:
   receive an IO workload; and
   analyze one or more SL workload volumes received within the IO workload.

3. The apparatus of claim 2, wherein the IO workload includes one or more IO operations, wherein each IO operation includes at least one of: a read request and a write request.

4. The apparatus of claim 1 further configured to:
   determine a current state of the global memory; and
   identify historical IO patterns of the IO workloads previously received by the storage array.

5. The apparatus of claim 1 further configured to:
   determine a current state of the global memory; and
   identify an SL workload usage pattern of the global memory based on an IO SL workload usage history of the global memory.

6. The apparatus of claim 5 further configured to:
   determine a current state of each cache slot of the global memory; and
   identify an IO operation SL tier usage pattern of each cache slot based on a history of IO SL tier usage of each cache slot, wherein each SL tier corresponds to an expected performance metric related to processing an IO operation of each SL tier by the storage array.

7. The apparatus of claim 6 further configured to generate an SL trend model corresponding to the SL tier usage pattern using a machine learning engine configured to process IO workloads using one or more pattern learning techniques such as an inference learning technique.

8. The apparatus of claim 7 further configured to dynamically partition the global memory into one or more cache banks based on the SL trend model.

9. The apparatus of claim 8 further configured to use the SL trend model to control usage of each cache slot and/or cache bank by incoming IO operations.

10. The apparatus of claim 8 further configured to:
dynamically assign each cache slot to cache IO operations of a particular SL tier by modifying metadata of each cache; and
establish a time threshold during which each cache slot can be exclusively assigned to cache IO operations associated with any particular SL tier.

11. A method comprising:
dynamically partition a global memory of a storage array into one or more cache partitions based on an anticipated activity of one or more input/output (IO) service level (SL) workload volumes, wherein dynamically partitioning the global memory includes partitioning the global memory along a first dimension corresponding to IO type and a second dimension corresponding to track sizes of IO operations in an IO workload;
dynamically establishing SL cache groups from the partitioned global memory based on an anticipated activity, wherein SL cache group establishment includes dynamically setting a bit in each global memory cache slot, defining each cache slot's assigned SL cache group; and
increasing an amount of global memory cache slots assigned to process critical IOs or limiting non-critical IO consumption of the global memory cache slots based on a quality of service (QoS) corresponding to each IO service level.

12. The method of claim 11 further comprising:
receiving an IO workload; and
analyzing one or more SL workload volumes received within the IO workload.

13. The method of claim 12, wherein the IO workload includes one or more IO operations, wherein each IO operation includes at least one of: a read request and a write request.

14. The method of claim 11 further comprising:
determining a current state of the global memory; and
identifying historical IO patterns of the IO workloads previously received by the storage array.

15. The method of claim 11 further comprising:
determining a current state of the global memory; and
identifying an SL workload usage pattern of the global memory based on an IO SL workload usage history of the global memory.

16. The method of claim 15 further comprising:
determining a current state of each cache slot of the global memory; and
identifying an IO operation SL tier usage pattern of each cache slot based on a history of IO SL tier usage of each cache slot, wherein each SL tier corresponds to an expected performance metric related to processing an IO operation of each SL tier by the storage array.

17. The method of claim 16 further comprising generating an SL trend model corresponding to the SL tier usage pattern using a machine learning engine including process IO workloads using one or more pattern learning techniques such as an inference learning technique.

18. The method of claim 17 further comprising dynamically partitioning the global memory into one or more cache banks based on the SL trend model.

19. The method of claim 18 further comprising using the SL trend model to control usage of each cache slot and/or cache bank by incoming IO operations.

20. The method of claim 18 further comprising:
dynamically assigning each cache slot to cache IO operations of a particular SL tier by modifying metadata of each cache; and
establishing a time threshold during which each cache slot can be exclusively assigned to cache IO operations associated with any particular SL tier.

* * * * *